(12) United States Patent
Scholl et al.

(10) Patent No.: US 6,976,285 B1
(45) Date of Patent: Dec. 20, 2005

(54) FOUR-HINGED WIPER ARM FOR A WINDSHIELD WIPER SYSTEM

(75) Inventors: Wolfgang Scholl, Gemmrigheim (DE); Herbert Bienert, Bidigheim (DE)

(73) Assignee: Valeo Auto-Electric Wischer und Motoren GmbH, (DE)

( * ) Notice: Subject to any disclaimer, the term of this patent is extended or adjusted under 35 U.S.C. 154(b) by 0 days.

(21) Appl. No.: 09/622,356

(22) PCT Filed: Feb. 1, 1999

(86) PCT No.: PCT/EP99/00637

§ 371 (c)(1),
(2), (4) Date: Aug. 15, 2000

(87) PCT Pub. No.: WO99/42346

PCT Pub. Date: Aug. 26, 1999

(30) Foreign Application Priority Data

Feb. 20, 1998 (DE) ................................ 198 07 062

(51) Int. Cl.⁷ ............................ B60S 1/06; B60S 1/24; D60S 1/34
(52) U.S. Cl. ............................ 15/250.21; 15/250.31; 15/250.351
(58) Field of Search ....................... 15/250.21, 250.31, 15/250.351, 250.23

(56) References Cited

U.S. PATENT DOCUMENTS

| | | | | |
|---|---|---|---|---|
| 2,615,190 A | * | 10/1952 | Shaw et al. .............. | 15/250.23 |
| 3,734,582 A | * | 5/1973 | Beauchet .................... | 384/492 |
| 4,683,605 A | * | 8/1987 | Leroy et al. .............. | 15/250.21 |
| 5,009,412 A | * | 4/1991 | Roodenburg et al. ......... | 472/59 |
| 5,884,357 A | * | 3/1999 | Schill et al. ............. | 15/250.21 |
| 5,934,589 A | * | 8/1999 | Young ........................ | 242/321 |

FOREIGN PATENT DOCUMENTS

GB 2145168 A * 3/1985 ........... F16C 25/06

OTHER PUBLICATIONS

Current Solutions, Inc., Ball Bearing Vs. Sleeve Fans: A Comparison in Performance, www.currentsolutions.com/knowledge/ballbearingvssleevefans.htm.*

* cited by examiner

Primary Examiner—John Kim
Assistant Examiner—Shay Balsis
(74) Attorney, Agent, or Firm—Young & Basile, P.C.

(57) ABSTRACT

The invention relates to a four-hinged wiper arm for a windshield wiper system, especially for an automobile wherein a connecting rod is pivotally connected to a driving arm in a first bearing point and to a control arm in a second bearing point. A hinged part is coupled to the connecting rod. A wiper blade that can be placed on the hinged part or on a wiper rod connected to the hinged part can be pressed against the windshield to be wiped by a spring element that is mounted on the four-hinged wiper arm. In order to ensure good wiping quality and low-noise operation over a long service period, the invention provides that the connecting rod or the driving arm or the control arm is fitted with an antifriction bearing at least one of the two locating points of the four hinged wiper arm. According to advantageous embodiments of the invention, the four-hinged wiper arm is fitted with an antifriction bearing on both bearing points, whereby the antifriction bearing is preferably a deep groove ball bearing.

22 Claims, 1 Drawing Sheet

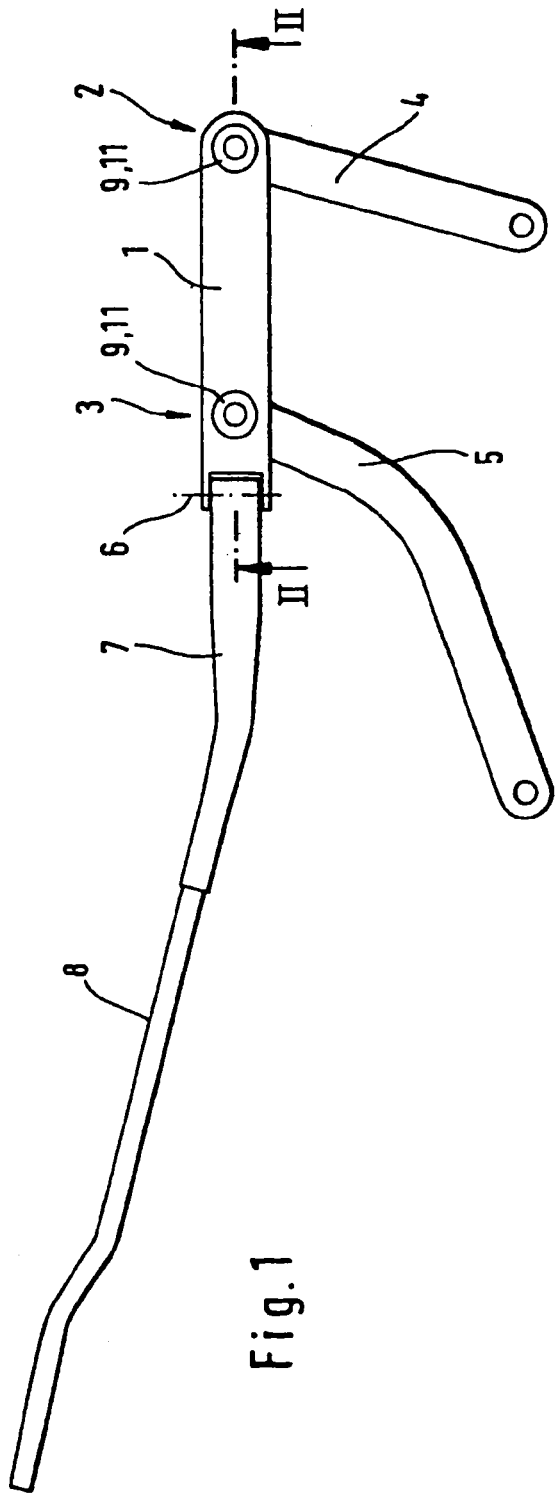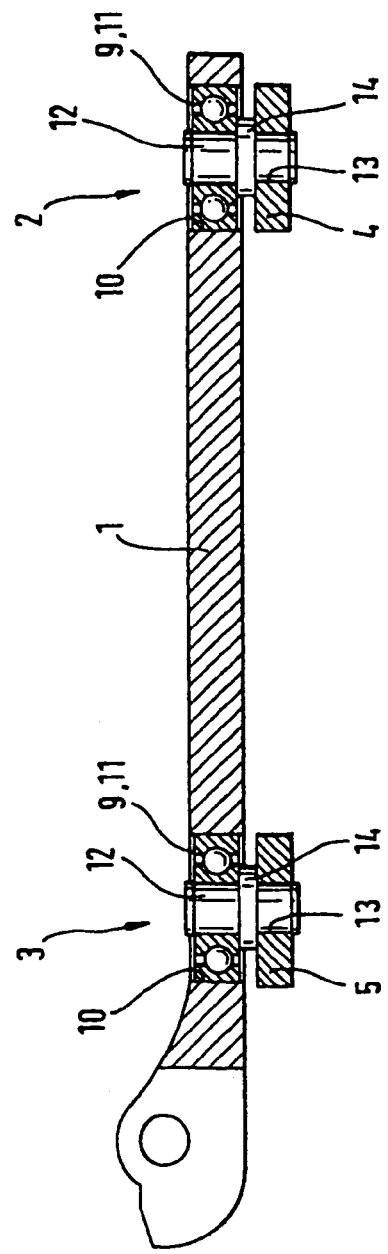

FOUR-HINGED WIPER ARM FOR A WINDSHIELD WIPER SYSTEM

BACKGROUND

The invention pertains to a four-hinged wiper arm for a windshield wiper system, especially for an automobile, wherein a connecting rod is connected to a driving arm at a first bearing point and to a control arm at a second bearing point so that it can pivot, a hinged part is coupled to the connecting rod, and a wiper blade that can be placed on the hinged part or on a wiper rod connected to the hinged part can be pressed against the windshield to be wiped by a spring element that is mounted on the four-hinged wiper arm.

A four-hinged wiper arm of this kind has already become known from DE 42 14 679 A1. In this wiper arm, the connecting rod is connected to a driving arm at a first bearing point by means of a cylinder bolt so that it can pivot, and it is connected to a control arm at a second bearing point by means of a cylinder bolt so that it can pivot, wherein the cylinder bolts are each mounted directly in a bearing hole of the connecting rod and/or a bearing hole of the driving arm and the control arm, respectively, so that they can rotate. Bearing points of this kind can be designed with a small structural height, however, they are not suitable for transferring with high efficiency, and without free play; the large radial and axial forces occurring during operation of the wiper arm over long operating times. Even after a short operating time, interfering bearing play may occur, which, on the one hand, greatly reduces the wiping quality and, on the other hand, can result in an interfering formation of noise.

SUMMARY

The invention is based on the problem of improving a four-hinged wiper arm of the kind described above, in such a manner that the bearing points of the connecting rod with the driving arm and the control arm, respectively, satisfy the strict requirements, over the long term, with regard to high-efficiency, non-play transmission of large radial and axial forces.

In the case of a four-hinged wiper arm according to this invention a connecting rod or the driving arm or the control arm is provided with a rolling-contact bearing on at least one of the two bearing points of the four-hinged wiper arm. Just the provision of one of the two bearing points with a rolling-contact bearing enables a more rigid and more exact control of the connecting rod over a longer operating time, in particular, when the bearing point of the connecting rod with the driving arm is equipped with a rolling-contact bearing. This will ensure good wiping quality and less noisy movement of the windshield wiper system over longer operating times.

In order to ensure a non-play bearing over a long operating time, even under very large radial and axial forces to be transferred, it is recommended to use a design such that at least one of the rolling-contact bearings is a deep groove ball bearing. Due to their design configuration, deep groove ball bearings are particularly well-suited for non-play transmission of large radial and axial forces.

However, a favorable embodiment of the invention provides that the four-hinged wiper arm is equipped with a rolling-contact bearing, preferably with a deep groove ball bearing, both at the first bearing point of the connecting rod with the driving arm, and also at the second bearing point of the connecting rod with the control rod. Bearing points designed in this manner can withstand large forces in the axial and radial direction over long periods of time with no damage, so that a four-hinged wiper arm designed in this manner can satisfy the significant requirements with regard to good wiping quality and low-noise operation over very long operating times.

BRIEF DESCRIPTION OF THE DRAWINGS

Additional favorable embodiments and other advantages and details of the invention will be explained in greater detail below with reference to the figures which describe one particular embodiment example. In the accompanying figures:

FIG. 1 is a four-hinged wiper arm; and

FIG. 2 is a vertical cross section along line II—II in FIG. 1 through the connecting rod and the two bearing points.

DETAILED DESCRIPTION

The four-hinged wiper arm shown schematically in FIG. 1 has the essential components of the four-hinged construction consisting of a connecting rod 1 with a first bearing point 2 and a second bearing point 3. The connecting rod 1 is pivotally mounted at the first bearing point 2 to one end of a driving arm 4 so that it can pivot about the first-bearing point 7. The connecting rod 1 is also pivotally connected at the second bearing point 3 to one end of a control arm 5. The other end of the driving arm 4 is attached to a pendulum-driveable wiper shaft (not shown) which is arranged in a chassis-mounted wiper bearing so that it can also rotate. The other end of the control arm 5 is fixed to a control shaft, which is arranged in a likewise chassis-mounted bearing so that it can rotate. Thus, an articulated rectangle is formed by the connecting rod 1, the driving arm 4, the control arm 5 and a chassis-mounted part of the vehicle running between the free ends of the driving arm 4 and the control arm 5.

In FIG. 1, the connecting rod 1 is extended to the left past the bearing point 3. At this end a hinged part 7 is coupled to the connecting rod 1 so that it can pivot about an axis 6 running parallel to the windshield to be wiped. As an extension of the hinged part 7, a wiper rod 8 attached to the hinged part 7 can be seen, this wiper rod is designed in a known manner with a free end for connection to a wiper blade (not illustrated). It is essential to the invention that at each of the two bearing points 2 and 3 of the connecting rod 1, there is one rolling-contact bearing 9 in the form of a deep groove ball bearing 11 for the pivotable connection between the connecting rod 1 and the driving arm 4 and the control arm 5, respectively.

Additional details of the invention are visible from the enlarged, schematic illustration (with respect to FIG. 1) that is presented in FIG. 2. The connecting rod 1 shown in FIG. 2 consists of metal and, in the region of the first bearing point 2 and in the region of the second bearing point 3, it has essentially the same design. The only difference consists in that the connecting rod 1 is connected to the driving arm 4 at the first bearing point 2 so that it can pivot and it is connected to the control arm 5 at the second bearing point 3 so that it can also pivot. At the two bearing points 2 and 3, the connecting rod 1 has a recess 10 into which the outer ring of a deep groove ball bearing 11 is fit. The fit is structured so that the deep groove ball bearing 11 is axially fixed in the recess 10 and will not turn. For a particularly dependable axial mount, the edges of the recess 10 are caulked locally or around the perimeter. In this regard, it should be pointed out that the deep groove ball bearing 11 is shown only schematically in the drawing for reasons of simplicity. Since deep groove ball bearings are a standard part already known in the technical world, a more detailed illustration and description can be omitted at this point.

In the event that the connecting rod 1 is made of a plastic material, the at least one rolling-contact bearing 9 or deep groove ball bearing 11 can be injection molded into the connecting rod 1.

It is clearly evident, in particular in FIG. 1, that the connection between the driving arm 4 or the control arm 5 and the connecting rod 1 takes place by means of a riveted bolt 12. The upper end of the riveted bolt 12 is fit into the inner ring of the deep groove ball bearing 11, and the lower end of the riveted bolt 12 is fit into a passage 13 in the driving arm 4 or the control arm 5. Whereas in the middle region of the riveted bolt 12 there is a narrow, radially protruding flange 14 whose one side rests against the inner ring of the deep groove ball bearing 11 and whose other side rests against the driving arm 4 or control arm 5. The opposing ends of the riveted bolt are each mounted in place axially by wobble riveting and are connected rotation-tight to the inner ring of the deep groove ball bearing 11 or to the driving arm 4 or control arm 5 so that they do not rotate and maintain coaxial alignment with the outer ring to provide the non-play bearing. Due to the flange 14 of the riveted bolt 12, on the one hand, the spacing between the driving arm 4 or control arm 5 and the connecting rod 1—necessary for mobility—will be assured, and, on the other hand, a stable connection of the riveted bolt 12 to the deep groove ball bearing 11 and to the driving arm 4 or control arm 5 will be assured.

In the described four-hinged wiper arm, both the driving arm 4 and also the control arm 5 are Manufactured as stamped sheet metal parts. The advantage of this is that the four-hinged wiper arm, in particular in the region of the four-hinged construction, can be produced at a small structural height. However, the connecting rod 1 has a greater thickness than the driving arm 4 or control arm 5. On the other hand, since the rolling-contact bearing 9 or deep groove ball bearing 11 necessarily must have a particular structural height, it is an advantage to fix the rolling-contact bearing 9 or deep groove ball bearing 11 to the connecting rod 1. This will assure a dependable and stable mount of the rolling-contact bearing 9 or deep groove ball bearing 11 to the connecting rod 1. With a different design of the driving arm 4 or the control arm 5 with sufficient thickness in the region of the bearing point 2 or 3, for example, as a cast metal part or as an injection molded plastic part, the corresponding rolling-contact bearing 9 or deep groove ball bearing 11 can also be held against the driving arm 4 or control arm 5, whereas the bolt 12, on the other hand, is directly mounted to the connecting rod 1.

When using a riveted bolt 12 to generate the connection between the connecting rod 1 and the driving arm 4 or control arm 5 by means of a rolling-contact bearing 9 or deep groove ball bearing 11, a cost-effective assembly or manufacture can be obtained by means of wobble riveting. With wobble riveting of the riveted bolt 12 on both sides, the flange 14 formed in the middle region of the bolt 12 will ensure a good support against the forces generated during the riveting process.

Since the function and operation of a four-hinged wiper arm is generally known to a person skilled in the art, it need not be described in further detail here.

What is claimed is:

1. A four-hinged wiper arm for a windshield wiper system, comprising:
    a single piece connecting rod pivotally connected to a driving arm at a first bearing point on the connecting rod and to a control arm at a second bearing point on the connecting rod, a hinged part coupled to the connecting rod at an axis, a wiper blade placeable on one of the hinged part and a wiper rod connected to the hinged part can be pressed against the windshield to be wiped by a spring element that is mounted on the four-hinged wiper arm, wherein one of the connecting rod, the driving arm, and the control arm is provided with a co-axial rolling-contact bearing relative to a passage in at least one of the first and second bearing points of the four-hinged wiper arm and inner and outer races of the bearing are axially and radially fixed to be non-rotatable with respect to the connecting rod and at least one of the control arm and driving arm allowing transmission of large radial and axial forces without play, wherein the inner race of the bearing is fixed by wobble riveting.

2. The four-hinged wiper arm according to claim 1 characterized in that an outer ring of the at least one rolling-contact bearing is axially secured and held, so that it does not rotate in one recess of the connecting rod whereas a bolt, attached to one of the driving arm and the control arm, is fitted into an inner ring of the rolling-contact bearing and is axially secured and non-rotatably held.

3. The four-hinged wiper arm according to claim 2 characterized in that the bolt used on the at least one first and second bearing point is a riveted bolt.

4. A four-hinged wiper arm for a windshield wiper system comprising;
    a connecting rod pivotally connected to a driving arm at a first bearing point on the connecting rod and to a control arm at a second bearing point on the connecting rod, a hinged part coupled to the connecting rod at an axis, a wiper blade placeable on one of the hinged part and a wiper rod connected to the hinged part can be pressed against the windshield to be wiped by a spring element that is mounted on the four-hinged wiper arm, wherein one of the connecting rod, the driving arm, and the control arm is provided with a co-axial rolling-contact bearing relative to a passage in at least one of the first and second bearing points of the four-hinged wiper arm and inner and outer races of the bearing are axially and radially fixed to be non-rotatable with respect to the connecting rod and at least one of the control arm and driving arm allowing transmission of large radial and axial forces without play;
    an outer ring of the at least one rolling-contact bearing is axially secured and held, so that it does not rotate in one recess of the connecting rod whereas a bolt, attached to one of the driving arm and the control arm, is fitted into an inner ring of the rolling-contact bearing and is axially secured and non-rotatably held, wherein the bolt used on the at least one first and second bearing point is a riveted bolt, and wherein the riveted bolt is secured by wobble riveting the passage of one of the driving arm and control arm, and by wobble riveting at the inner ring of the rolling-contact bearing, wherein the riveted bolt has a radially protruding flange in a middle region, with one side that rest against one of the driving am and the control arm, and another side that rests against a front surface of the inner ring of the rolling-contact bearing.

5. The four-hinged wiper arm according to claim 4, characterized in that at least one of the rolling-contact bearings is a deep groove ball bearing.

6. The four-hinged wiper arm according to claim 4 characterized in that the driving arm and the control arm are made of sheet metal.

7. The four-hinged wiper arm according to claim 4, further comprising a rolling-contact bearing with a deep groove ball bearing both at the first bearing point between the connecting rod and the driving arm and at the second bearing point between the connecting rod and the control arm.

8. The four-hinged wiper arm according to claim 4 characterized in that each of the fist and second bearing points of the four hinged wiper arm is provided with a co-axial rolling-contact bearing, each inner and outer race of the bearing is axially and radially fixed to be non-rotatable with respect to the connecting rod and the control arm for the first bearing point and the connecting rod and the driving arm for the second bearing point, allowing transmission of large radial and axial forces without play.

9. The four-hinged wiper arm according to claim 8, wherein an outer ring of each rolling-contact bearing is axially secured and held, so that the outer rings do not rotate in the recesses of the connecting rod, whereas the bolts attached to the driving arm and the control arm are fitted into an inner ring of each of the rolling contact bearings and are axially secured and non-rotatably held.

10. The four-hinged wiper arm according to claim 9, wherein the bolts each include a radially protruding flange having one side resting against the inner ring and an opposing side of one of the bolts resting against the driving arm and the opposing side of the other bolt resting against the control arm.

11. In a four-hinged wiper arm for a windshield wiper, having a single piece connecting rod pivotally connected to a driving arm at a first bearing point on the connecting rod and to a control arm at a second bearing point on the connecting rod and a hinged part coupled to the connecting rod and a wiper rod connected to the hinged part for pressing against the windshield to be wiped by a spring element mounted on the four-hinged wiper arm, the improvement comprising:

a rolling-contact bearing provided with one of the connecting rod and driving arm in at least one of the first and second bearing points of the four-hinged wiper arm wherein the rolling contact bearing has a first member axially fixed in a recess of one of the connect rod and driving arm and a second member coaxially aligned to the first member in a non-play relationship, and connected to the other one of the connecting rod and driving arm by wobble riveting.

12. The improvement according to claim 11 wherein the rolling-contact bearing has an inner and outer ring and that the outer ring of the at least one rolling-contact bearing is axially secured and held, so that it does not rotate in one recess of the connecting rod whereas a bolt, attached to one of the driving arm and the control arm, is fitted into the inner ring of the rolling-contact bearing and is axially secured and non-rotatably held.

13. The improvement according to claim 12, wherein the bolt used on the at least one first and second bearing point is a riveted bolt.

14. A four-hinged wiper arm for a windshield wiper, having a connecting rod pivotally connected to a driving arm at a first bearing point on the connecting rod and to a control arm at a second bearing point on the connecting rod and a hinged part coupled to the connecting rod and a wiper rod connected to the hinged part for pressing against the windshield to be wiped by a spring element mounted on the four-hinged wiper arm, the improvement comprising:

a rolling-contact bearing provided with one of the connecting rod and driving arm in at least one of the first and second bearing points of the four-hinged wiper arm wherein the rolling contact bearing has a first member axially fixed in a recess of one of the connecting rod and driving arm and a second member maintaining coaxially aligned to the first member in a non-play relationship, wherein the rolling-contact bearing has an inner and outer ring and the outer ring of the at least one rolling-contact bearing is axially secured and held, so that the outer ring does not rotate in one recess of the connecting rod whereas a bolt, attached to one of the driving arm and the control arm, is fitted into the inner ring of the rolling-contact bearing and is axially secured and non-rotatably held, wherein the bolt used on the at least one first and second bearing point is a riveted bolt, and wherein the riveted bolt is secured by wobble riveting in a passage in one of the driving arm and control arm, and by wobble riveting at an inner ring of the rolling-contact bearing.

15. The improvement according to claim 14, wherein at least one of the rolling-contact bearings is a deep groove ball bearing.

16. The improvement according to claim 14, wherein the driving arm and the control arm are made of sheet metal.

17. The improvement according to claim 14, wherein the riveted bolt has a radially protruding flange in a middle region, with one side that rests against one of the driving arm and the control arm, and another side that rests against a front surface of the inner ring of the rolling-contact bearing.

18. The improvement according to claim 14, further comprising a rolling-contact bearing with a deep groove ball bearing both at the first bearing point between the connecting rod and the driving arm and at the second bearing point between the connecting rod and the control arm.

19. The improvement according to claim 14, wherein the bolt includes a radially protruding flange having one side resting against the inner ring and an opposing side resting against one of the driving arm and control arm.

20. The improvement according to claim 14, wherein each of the first and second bearing points of the four-hinged wiper arm is provided with a co-axial rolling-contact bearing, each outer and inner race of the bearing is axially and radially fixed to be non-rotatable with respect to the connecting rod and the control arm respectively for the first bearing point and the connecting rod and driving arm respectively for the second bearing point, allowing transmission of large radial and axial forces without play.

21. The improvement according to claim 20, wherein an outer ring of each rolling-contact bearing is axially secured and held, so that the outer rings do not rotate in the recesses of the connecting rod, whereas the bolts attached to the driving arm and the control arm are fitted into an inner ring of each of the rolling contact bearings and are axially secured and non-rotatably held.

22. A four-hinged wiper arm for a windshield wiper system comprising:

a single piece connecting rod pivotally connected to a driving arm at a first bearing point on the connecting rod and to a control arm at a second bearing point on the connecting rod, a hinged part coupled to the connecting rod at an axis, a wiper blade placeable on one of the hinged part and a wiper rod connected to the hinged part to be pressed against the windshield to be wiped by a spring element mounted on the four-hinged wiper arm, wherein at least one of the connecting rod, the driving arm, and the control arm is provided with a rolling-contact bearing in at least one of the first and second bearing points of the four-hinged wiper arm, at least one of the first and second bearing points having an outer ring of a deep groove ball bearing secured in an axially-fixed, non-rotatable manner within a recess of the connecting rod, one end of a riveted bolt fixedly secured into a passage in at least one of the driving arm and the control arm with an opposite end of the riveted bolt being wobble riveted non-rotatably to the inner ring of the deep groove ball bearing, such that the first and second bearing points provide non-play transmission of large radial and axial forces.

* * * * *